(No Model.) 2 Sheets—Sheet 1.
H. WAPPALHORST
BAND CUTTER AND FEEDER FOR THRESHING MACHINES.
No. 576,011. Patented Jan. 26, 1897.
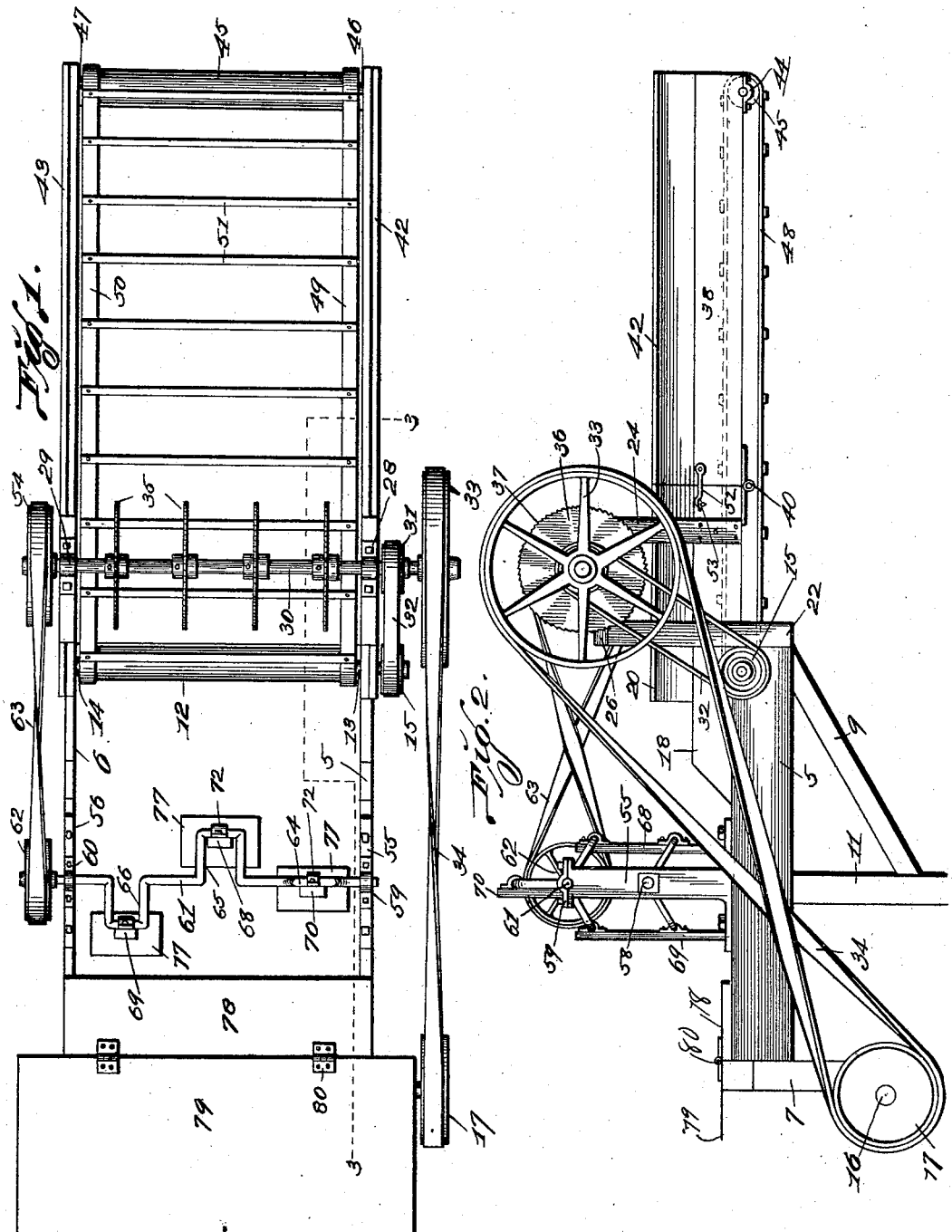
Attest:
N. J. Smith
S. G. Wells
Inventor:—
Hanry Wappalhorst:—
By Higdon Longan & Higdon
Attys.

(No Model.) 2 Sheets—Sheet 2.
H. WAPPALHORST.
BAND CUTTER AND FEEDER FOR THRESHING MACHINES.
No. 576,011. Patented Jan. 26, 1897.
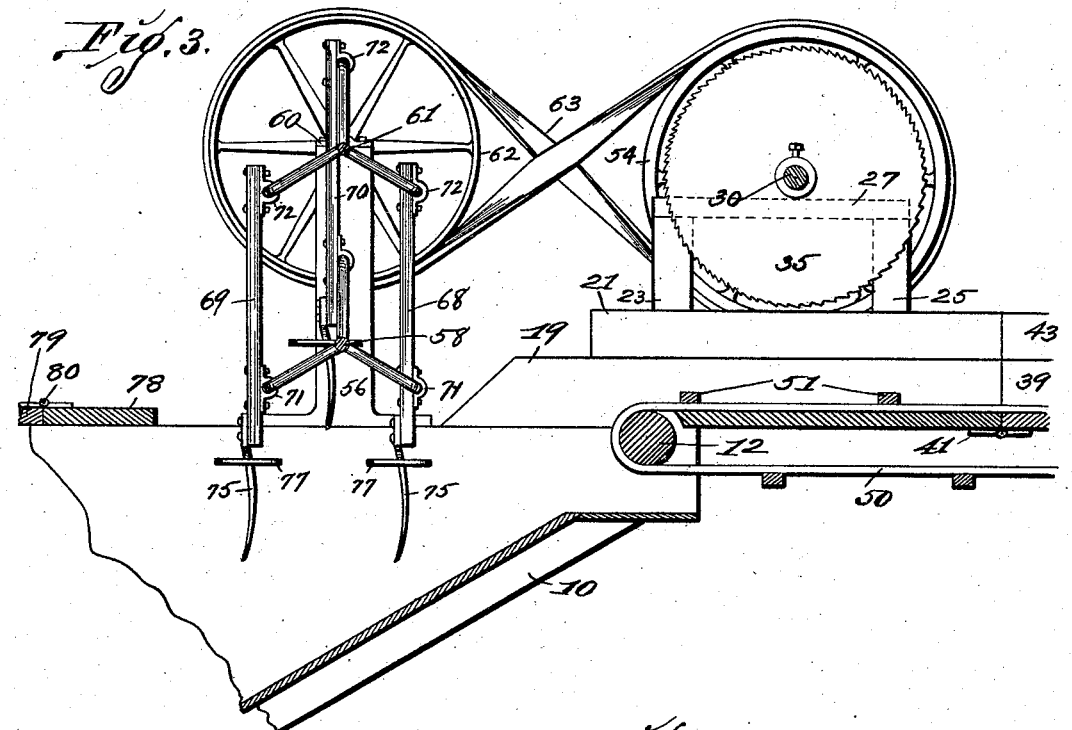
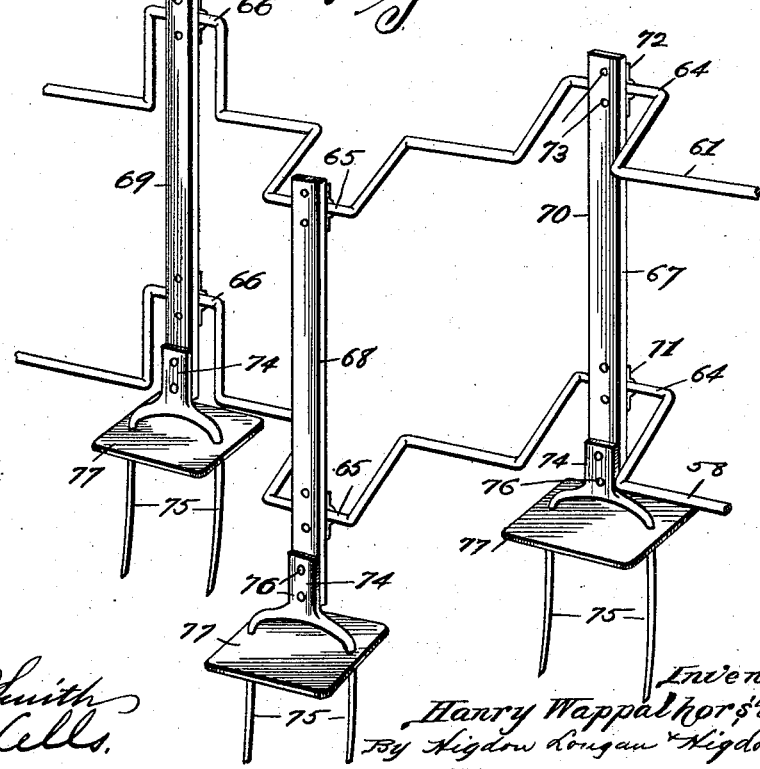
Attest:
W. Smith
S. G. Wells
Inventor:
Henry Wappalhorst
By Higdon Longan & Higdon
Attys

UNITED STATES PATENT OFFICE.

HANRY WAPPALHORST, OF ST. CHARLES, MISSOURI.

BAND-CUTTER AND FEEDER FOR THRESHING-MACHINES.

SPECIFICATION forming part of Letters Patent No. 576,011, dated January 26, 1897.

Application filed September 14, 1896. Serial No. 605,755. (No model.)

*To all whom it may concern:*

Be it known that I, HANRY WAPPALHORST, of the city of St. Charles, St. Charles county, State of Missouri, have invented certain new and useful Improvements in Band-Cutters and Feeders for Threshing-Machines, of which the following is a full, clear, and exact description, reference being had to the accompanying drawings, forming a part hereof.

My invention relates to band-cutters and feeders; and it consists in the novel construction, combination, and arrangement of parts hereinafter shown, described, and claimed.

Figure 1 is a top plan view of my improved band-cutter and feeder attached to a threshing-machine, parts of the machine being broken away to economize space. Fig. 2 is a side elevation of the parts shown in Fig. 1. Fig. 3 is a vertical longitudinal sectional view taken approximately on the line 3 3 of Fig. 1 and upon an enlarged scale, parts being broken away to economize space. Fig. 4 is a view in perspective of the pitchforks or pickers of which I make use and the means of operating the same, parts being broken away to economize space.

In the construction of my improved band-cutter and feeder the side pieces 5 and 6 are placed in horizontal parallel positions with their rear ends attached to the vertical posts 7 and 8 of the threshing-machine and with their front ends resting upon the upper ends of the braces 9 and 10. The center of the side pieces 5 and 6 rest upon and are attached to the vertical posts 11, to which posts the lower ends of the braces 9 and 10 are fixed. Mounted between the front ends of the side pieces 5 and 6 and transversely thereof is a cylinder 12, having spindles 13 and 14 extending one from each end of said cylinder through and operating in bearings in said side pieces 5 and 6. Upon the outer end of the spindle 13 and outside of the side piece 5 is a belt-wheel 15, rigidly fixed to said spindle. The space between the side pieces 5 and 6 is open and communicates with the throat of the threshing-machine.

Upon the outer end of the threshing-machine cylinder is fixed a belt-wheel 17, said belt-wheel being upon the same side of the threshing-machine as the belt-wheel 15 and outside of the line of said belt-wheel 15.

The lower edges of the rear end of the side-boards 18 and 19 rest upon the upper edges of the front ends of the side pieces 5 and 6 and are secured in position, and the sheet-metal side-boards 20 and 21 are mounted with their lower edges resting upon the upper edges of said side-boards 18 and 19 and with their front ends in vertical alinement with the front ends of said side-boards 18 and 19. The posts 22 and 23 are attached to the front ends of the side pieces 5 and 6 and extend upwardly outside of the sides 18 and 20 and 19 and 21, respectively, to a position somewhat above the upper edges of said side-boards 20 and 21. Posts 24 and 25 are attached to the outer sides and near the front ends of the side pieces 18 and 19 and extend upwardly in positions parallel with the posts 22 and 23, and with their upper ends in horizontal alinement with said posts 22 and 23.

A cross-bar 26 is mounted in a horizontal position upon the upper ends of the posts 22 and 24 and a similar cross-bar 27 is mounted in a horizontal position upon the upper ends of the posts 23 and 25. Bearings 28 and 29 are mounted in horizontal and transverse alinement with each other and fixed to the upper sides of the cross-bars 26 and 27, and a shaft 30 is mounted in said bearings 28 and 29. A belt-wheel 31 is mounted upon and fixed to the shaft 30, outside of the bearing 28 and in alinement with the belt-wheel 15, and a belt 32 connects said belt-wheels 15 and 31.

A large belt-wheel 33 is mounted upon the outer end of the shaft 30 and outside of the belt-wheel 31 and in alinement with the belt-wheel 17, and a cross-belt 34 connects said belt-wheels 17 and 33. The belt 34 is driven by the operation of the threshing-machine cylinder driving the belt-wheel 17 and the band-cutter and feeder is driven by said belt 34.

The band-cutters 35, each of which band-cutters consists of a disk 36, having the teeth 37 upon its periphery, are mounted upon the shaft 30 between the bearings 28 and 29 and rigidly and adjustably fixed to said shaft. By crossing the belt 34, as shown, the band-cutters 35 are operated against the bands as they pass under said band-cutters, instead of being operated in the direction in which the bundles are passing, and I find that by this means there is less liability of the bands passing under the band-cutters without being cut.

The side pieces 38 and 39 are connected at their rear ends to the front ends of the side pieces 18 and 19 by means of the hinges 40 and 41 in such a way that said side pieces will swing downwardly. The sheet-metal side pieces 42 and 43 are attached at their lower edges to the upper edges of the side pieces 38 and 39 and in position to have their rear ends abut the front ends of the sheet-metal sideboards 20 and 21.

Horizontal and transversely-alined bearings 44 are attached to the front ends of the side pieces 38 and 39, and a cylinder 45 is mounted between said bearings with the spindles 46 and 47 of said cylinder extending through and operating in said bearings.

An endless carrier 48, consisting of the belts 49 and 50, connected by the slats 51, connects the cylinders 12 and 45, and said carrier is driven by the belt 32, driving the belt-wheel 15, which belt-wheel is fixed to the spindle 13 of the cylinder 12. The bundles of grain are thrown upon the carrier 48, between the side pieces 42 and 43, and by said carrier said bundles are carried under the band-cutters 35, and by said cutters operating as before described said bands are cut, thus loosening the grain composing said bundles and dumping said grain into the space between the side pieces 5 and 6.

Hooks 52 are pivotally attached to the rear upper corners and outer faces of the side pieces 38 and 39 and in position to connect with the pins 53, which pins extend outwardly from the upper front corners of the side pieces 18 and 19. When the hooks 52 are disengaged from the pins 53, the front end of the carrier will swing downwardly and backwardly and may be attached to the lower front part of the separator, and thus held out of the way of the horses which may be attached to the separator for moving said separator.

A belt-wheel 54 is fixed to the outer end of the shaft 30 and outside of the bearing 29. Posts 55 and 56 are rigidly mounted upon the upper sides of the side pieces 5 and 6 and above the upper ends of the vertical posts 11 and 12, and horizontal transversely-alined bearings 57 are formed in or connected to said posts, said bearings being located approximately half-way between the ends of said posts. A triple crank-shaft 58 is mounted in said bearings.

At the upper ends of the posts 55 and 56 are bearings 59 and 60 in horizontal and transverse alinement with each other, and a triple crank-shaft 61 is mounted in said bearings 59 and 60. Upon the outer end of the triple crank-shaft 61 and outside of the bearing 60 is a belt-wheel 62 in alinement with the belt-wheel 54, and the cross-belt 63 connects said belt-wheels 62 and 54, thus driving said crank-shaft by the operation of the shaft 30 and in a direction opposite to that of the shaft 30. If the belt 34 is not crossed, then the belt 63 should not be crossed, but I prefer to cross the belt 34 for the reasons heretofore stated, and that makes it necessary to cross the belt 63. The triple crank-shafts 58 and 61 are essentially alike and must be mounted substantially in alinement with each other. Each of said crank-shafts has the three cranks 64, 65, and 66 arranged radially relative to each other and to a common center.

A pitchfork or picker 67 connects the cranks 64, and similar pitchforks 68 and 69 connect the cranks 65 and 66, respectively. The pitchforks 67, 68, and 69 are essentially alike, and each consists of a bar 70, which bar performs the function of a handle for the forks, and said bar is connected to its respective cranks by means of the bearings 71 and 72, in which said cranks rotatably operate, and said bearings being attached to said bar by means of the bolts or screws 73. The bearings 71 and 72 upon each of the bars 70 are equal distances apart.

A fork consisting of the block 74 and the tines 75 is attached to the lower end of the bar 70 by means of the bolts or screws 76. The tines 75 are formed integral with the block 74 and extend downwardly in parallel positions through the guards 77, which guards are flat metallic plates mounted horizontally and rigidly fixed to the upper ends of the tines 75. The object of the guards 77 is to prevent the straw and grain from climbing up the bars 70 and becoming entangled with the crank-shafts. The pitchforks 67, 68, and 69 are operated by the operation of the belt-wheel 62 upon the crank-shaft 61.

It is obvious that when the crank-shaft 61 is rotated the crank-shaft 58 will also be rotated on account of the manner in which said crank-shafts are connected by means of the bars 70.

By the use of the two crank-shafts 58 and 61, as described, the pitchforks are maintained in a vertical position at all times during their operation, and said pitchforks are mounted in position to take the grain as it comes from the rear end of the endless carrier 48 and pitch it into the throat of the threshing-machine, from which throat it will be taken by the cylinder of the threshing-machine. The grain is carried toward the threshing-machine cylinder by the downward strokes of the pitchforks, and by maintaining said pitchforks in a vertical position the tines of said forks will go straight down into the grain and will be withdrawn straight upwardly from the grain instead of being forced into the grain at one angle, then being oscillated and withdrawn from the grain at a different angle, as in the old devices. By this means the liability of the forks becoming clogged is greatly lessened and said forks will operate much easier and more efficient than would be the case if they were driven by a single crank-shaft, as in the devices heretofore in use.

A trap-door 78 is connected to the cap 79 of the threshing-machine cylinder by means of the hinges 80, and said trap-door normally rests upon the rear ends and upper edges of the side pieces 5 and 6 and behind the pitchforks, thus partially closing the space between said side pieces 5 and 6.

The grain coming from the carrier 48 is advanced by the pitchforks and passes under the trap-door 78 through the threshing-machine cylinder, and should the threshing-machine cylinder become clogged access may be obtained to said cylinder by simply turning the trap-door 78 backwardly upon the cap 79 of the cylinder.

When a band-cutter and feeder is constructed in accordance with the principles of my invention, as herein shown and described, it is unnecessary that the operating parts be inclosed, as in the devices heretofore in use, and by this construction I not only obtain greater efficiency, but I obtain this efficiency with less mechanism, and consequently with less expense, than is involved in the old devices.

I claim—

1. In a band-cutter and feeder, two crank-shafts rotatably mounted one above the other, bars connecting the cranks of one shaft with the corresponding cranks of the other shaft, forks attached to the lower ends of said bars, guards positioned transversely of the tines of said forks and at the upper ends thereof and means for rotating said shafts, which means consists of the shaft 30 mounted in position parallel with said crank-shafts, the belt-wheel 17 upon the end of the cylinder-shaft, the belt-wheel 33 upon the end of said shaft 30 and in alinement with said belt-wheel 17, the crossed belt 34 connecting said belt-wheels 17 and 33, the belt-wheel 54 upon the end of said shaft 30, the belt-wheel 62 upon the end of one of said crank-shafts and the crossed belt 63 connecting said belt-wheels 54 and 62, substantially as specified.

2. In a band-cutter and feeder, the crank-shafts 58 and 61 mounted in parallel positions, pitchforks connecting and operated by said shafts 58 and 61, each of which pitchforks consists of the bar 70, the bearings 71 and 72 connecting said bar to the respective shafts, the block 74 attached to the lower end of the bar 70, the tines 75 projecting from said block and formed integral therewith, and the guards 77 mounted horizontally and rigidly fixed to the upper ends of the tines 75, substantially as specified.

In testimony whereof I affix my signature in presence of two witnesses.

HANRY WAPPALHORST.

Witnesses:
SEMER G. WELLS,
MAUD GRIFFIN.